April 29, 1930. G. FERGUSON 1,756,148
ABSORPTION REFRIGERATING MACHINE
Filed Aug. 19, 1927
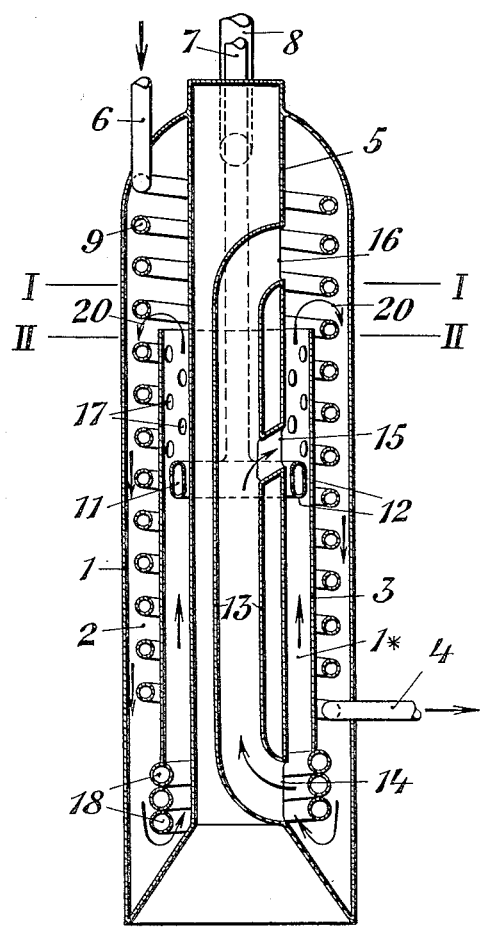
INVENTOR:
George Ferguson
BY Pennie, Davis, Marvin & Edmonds
ATTORNEY.

Patented Apr. 29, 1930

1,756,148

UNITED STATES PATENT OFFICE

GEORGE FERGUSON, OF THE HAGUE, NETHERLANDS, ASSIGNOR TO THE FIRM GEBRUDER SULZER, AKTIENGESELLSCHAFT AT WINTERTHUR

ABSORPTION REFRIGERATING MACHINE

Application filed August 19, 1927, Serial No. 214,196, and in Switzerland August 21, 1926.

This invention relates to absorption refrigerating machines operating on the reversing system and of the kind in which the generator absorber is divided into sections, and has for its object to provide an improved and more compact construction of such apparatus.

According to the present invention the sections of the generator absorber are so disposed that the part containing the cooling device surrounds the part containing the heating device, the two parts being preferably separated by a cylindrical partition disposed concentrically with relation to the pipe carrying the hot gases which serve to heat the solution during expulsion of the refrigerant. In the preferred construction the pipe through which refrigerant is returned from the evaporator opens out into the upper part of that portion of the generator absorber which surrounds the heating device, and the partition between the part to be heated and the part to be cooled is perforated above the level of the discharge end of this pipe so that the circulation of the solution may be maintained even though the liquid level falls below that of the top of the partition.

One construction according to the invention is illustrated by way of example in the accompanying drawing in which the generator absorber is shown in cross-sectional elevation.

In the construction illustrated in the drawing the generator absorber comprises an external cylindrical casing 1 within which is concentrically disposed a pipe 5 for conveying the hot gases which serve to heat the solution during expulsion of the refrigerant. A coiled tube 9 is also provided within the casing 1 and serves to circulate a cooling medium for the purpose of abstracting heat from the solution during the absorption period. Between the cooling coil 9 and the heating pipe 5 and concentric therewith is disposed a cylindrical partion 3 which divides the generator absorber into two sections one comprising the space 1* and the other the space 2, within which is placed the cooling coil 9.

In order to improve the circulation and to increase the available heating surface a circulation pipe 13 is provided in the interior of the heating pipe 5, this circulation pipe having an inlet at 14 and two outlets one at 15 and the other at 16. The gas expelled from solution when the apparatus is acting as a generator passes out to the condenser through the pipe 8 and the refrigerant is returned from the evaporator when the apparatus is acting as an absorber through the pipe 7, the lower end of which is connected to a ring 11 provided with holes 12 discharging into the space 1* near the upper end thereof so as to reduce the resistances offered by the liquid. The upper end of the partition 3 above the ring 11 is provided with holes 17 the purpose of which will be explained hereafter.

The manner of operation of the apparatus is as follows:

During the expulsion of refrigerant gas from solution, which is effected by means of hot gases passed up through the pipe 5, the solution in the space 1* is highly heated and begins to flow in the direction of the arrows 20, the expelled gas passing through the pipe 8 into the condenser (not shown). The solution flows out of the space 1*, over the top of the partition 3, down through the outer space 2, and then up through the space 1* and the circulation pipe 13, which it leaves by way of the outlet 16, or, if the liquid level has fallen below the line I—I, through the lower outlet 15. In this way an efficient circulation of the solution is kept up and all the heated points are continuously supplied with fresh liquid.

As soon as the quantity of gas necessary to produce the desired degree or refrigeration has been expelled the supply of heat is cut off automatically by means of a thermostat indicated at 18, and at the same time the flow of cooling medium through the coil 9 is started. The cooling medium enters the coil at the upper end 6 and leaves it at the lower end 4 so that when the supply of cooling medium is cut off at the end of the absorption period the coil 9 is completely emptied. The refrigerant from the evaporator passes down the pipe 7 and enters the space 2 below the level of the liquid through the holes 12 in the ring 11. The bubbles of gas rising through the liquid cause the flow of the latter to take place in the direction of the arrows 20 as before. Should the level of the liquid have fallen below the line II—II during the expulsion of gas then when the absorption begins the circulation of the solution takes place through the openings or perforations 17 in the upper end of the cylindrical partition 3.

Having now particularly described and ascertained the nature of my said invention and in what manner the same is to be performed, I declare that what I claim is:—

1. In an absorption refrigerating machine a generator absorber comprising a tubular chamber, a heating pipe passing through said chamber, a tubular member concentrically disposed about and spaced from said pipe, a discharge pipe for returning refrigerant arranged in the space between said heating pipe and said tubular member, and a cooling coil concentrically disposed about and spaced from said tubular member.

2. A generator absorber as set forth in claim 1 characterized by the provision of a circulation conduit disposed within the heating pipe and having an inlet opening in the lower portion of the tubular chamber and outlet openings at different levels in the upper portion.

3. In an absorption refrigerating machine a generator-absorber comprising a tubular chamber, a heating pipe arranged therein, a tubular member concentrically disposed about and spaced from said pipe terminating short of the upper and lower ends of said tubular chamber, a pipe for returning refrigerant provided with an outlet disposed in the upper portion of the space between said heating pipe and said tubular member, and a cooling coil concentrically disposed about and spaced from said tubular member.

4. A generator-absorber as set forth in claim 3 characterized by the provision of a tubular member perforated above the level of the outlet of the pipe for returning refrigerant, whereby the circulation of the solution in the generator chamber is maintained even though the liquid level falls below the upper extremity of the tubular member.

Dated this 5 day of August, 1927.

In testimony whereof I have affixed my signature.

GEORGE FERGUSON.